US011862418B2

(12) United States Patent
Triozon et al.

(10) Patent No.: US 11,862,418 B2
(45) Date of Patent: Jan. 2, 2024

(54) SWITCHING DEVICE FOR AN ELECTRICAL APPARATUS

(71) Applicant: Schneider Electric Industries SAS, Rueil Malmaison (FR)

(72) Inventors: André Triozon, Mâcon (FR); Jean-Michel Bonfils, Grenoble (FR); Emmanuel Kuentz, Claix (FR); Denis Guillet, Seyssinet-Pariset (FR); Denis Milan, Voiron (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/742,457

(22) Filed: May 12, 2022

(65) Prior Publication Data

US 2022/0384129 A1 Dec. 1, 2022

(30) Foreign Application Priority Data

May 25, 2021 (FR) ........................................ 2105433

(51) Int. Cl.

*H01H 33/664* (2006.01)
*H01H 11/00* (2006.01)
*H01H 33/66* (2006.01)

(52) U.S. Cl.

CPC .......... *H01H 33/664* (2013.01); *H01H 11/00* (2013.01); *H01H 33/6606* (2013.01)

(58) Field of Classification Search

CPC ............. H01H 33/664; H01H 33/6606; H01H 33/6661; H01H 33/126; H01H 11/00

(Continued)

(56) References Cited

U.S. PATENT DOCUMENTS

| | | | | |
|---|---|---|---|---|
| 2,480,622 A * | 8/1949 | Warnock | H01H 33/126 218/12 |
| 3,824,359 A * | 7/1974 | Date | H01H 33/127 218/10 |

(Continued)

FOREIGN PATENT DOCUMENTS

| | | |
|---|---|---|
| EP | 2182536 A1 | 5/2010 |
| FR | 3044162 A1 | 5/2017 |
| WO | 2010136424 A1 | 12/2010 |

OTHER PUBLICATIONS

French Search Report and Written Opinion dated Feb. 4, 2022 for corresponding French Patent Application No. FR2105433, 8 pages.

*Primary Examiner* — William A Bolton
(74) *Attorney, Agent, or Firm* — Locke Lord LLP

(57) ABSTRACT

A switching device, including:
- a main switch configured to be displaced between a closed position of a main circuit and an open position,
- a vacuum interrupter including:
  - a fixed electrode,
  - a mobile electrode, configured to be displaced between:
    - a first, so-called closed, position, and
    - a second, so-called open, position, in which the electrodes are apart,
- a palette configured to make the mobile electrode switch over from the first position to the second position and comprising an electrically conductive plate, the main switch being configured to drive the palette via the plate,
- a connection wire electrically linking the plate and the mobile electrode, the wire being in electrical contact with a tube disposed in an accommodating recess of the plate, wherein the accommodating recess comprises a wall exerting an elastic holding force on the tube.

14 Claims, 7 Drawing Sheets

(58) Field of Classification Search
USPC .......................... 218/118, 120, 140, 153, 154
See application file for complete search history.

(56) References Cited

U.S. PATENT DOCUMENTS

| | | | | |
|---|---|---|---|---|
| 5,155,315 | A * | 10/1992 | Malkin ................ | H01H 33/122<br>218/3 |
| 7,091,439 | B2 * | 8/2006 | Vaghini ................ | H01H 33/125<br>218/7 |
| 7,186,942 | B1 * | 3/2007 | Slade ................... | H01H 33/127<br>218/120 |
| 8,227,721 | B2 * | 7/2012 | Piccoz ............... | H01H 33/6661<br>218/120 |
| 9,058,948 | B2 * | 6/2015 | Grosjean .............. | H01H 33/126 |
| 9,679,724 | B2 * | 6/2017 | Abrahamsen ........ | H01H 33/128 |
| 2010/0102035 | A1 | 4/2010 | Piccoz et al. | |
| 2012/0048692 | A1 | 3/2012 | Piccoz et al. | |
| 2017/0301491 | A1 | 10/2017 | Zhang et al. | |

* cited by examiner

SWITCHING DEVICE FOR AN ELECTRICAL APPARATUS

TECHNICAL FIELD

The present invention relates to the field of the switching devices of medium voltage, i.e. 1 to 52 kV, electrical units. These switching devices incorporate vacuum interrupters, or interrupters in a vacuum. These vacuum interrupters make it possible to switch the current in the electrical unit reliably, and avoid the creation of an electrical arc.

PRIOR ART

It is known practice, notably from the patent EP2182536, to dispose a vacuum interrupter in parallel with the main circuit containing the main switch of a phase of an electrical apparatus, also hereafter called electrical unit. In such a circuit architecture, no current runs in the vacuum interrupter during normal operation, that is to say when the main switch is closed so as to make the current circulate in the main circuit. During the operation of opening of the main switch, the mobile part of the main switch closes the circuit in the branch comprising the vacuum interrupter, before the current is interrupted in the main branch. Then, the current is interrupted in the main branch, by the opening of the switch, such that all of the current then runs through the vacuum interrupter. In continuing its opening travel, the mobile part of the switch provokes the opening of the contact of the vacuum interrupter and the current is cut. The occurrence of an electrical arc on the main switch is thus avoided, since the electrical current runs only in the vacuum interrupter at the moment of the switching of the current. Since the vacuum interrupter is passed through by an electrical current only during the transient current switching phases, said vacuum interrupter can be simplified and of smaller size compared to the vacuum interrupters provided to be placed in series in the circuit of the main switch.

In order to produce the opening of the vacuum interrupter, the mobile contact of the main switch drives a palette mechanically linked to the mobile electrode of the vacuum interrupter, and which provokes the opening of the vacuum interrupter. In order to allow the electrical current to run in the vacuum interrupter, an electrical continuity between the main switch and the mobile electrode of the vacuum interrupter must be ensured. For that, the palette comprises an electrically conductive plate onto which the main switch comes into contact. This plate is linked electrically to the mobile electrode by a connection wire. The electrical link between the plate and the connection wire is generally produced by crimping. Thus, the plate can comprise a bent-back portion forming an oblong recess into which the wire is introduced, and this portion is then deformed so as to produce a crimping of the wire. In other words, the deformed portion crushes the wire, which ensures that the wire is mechanically held and an electrical connection is made.

The plate must have good resistance to the mechanical forces generated by the switch during the current opening phases. The plate is thus produced in a material with high elastic limit, for example stainless steel. However, this type of material exhibits a certain spring effect, that is to say that the pressure applied by the plate on the connection wire after crimping tends to be relaxed. This phenomenon limits the contact between the plate and the wire. Over the long term, the quality of the electrical connection between the plate and the wire can be degraded, which diminishes the efficiency of the current switching device.

The present disclosure aims to provide a solution that makes it possible to enhance the reliability of the electrical connection between the wire and the plate made of material with high elastic limit.

SUMMARY

To this end, the invention proposes a switching device of an electrical unit, comprising:

- a main switch configured to be displaced between a closed position allowing a passage of electrical current in a main electrical circuit of the electrical unit and an open position prohibiting the passage of electrical current in the main electrical circuit,
- a vacuum interrupter comprising:
  - a fixed electrode,
  - a mobile electrode, configured to be displaced between:
  - a first position, in which the fixed electrode and the mobile electrode are in contact, and
  - a second position, in which the fixed electrode and the mobile electrode are apart from one another,
- a palette mechanically linked to the mobile electrode, configured to make the mobile electrode switch over from the first position to the second position, the palette comprising an electrically conductive plate, the main switch being configured to drive the palette via the plate in the switchover from the closed position to the open position,

- a connection wire electrically linking the plate and the mobile electrode, the connection wire being in electrical contact with a connection tube disposed in an accommodating recess of the plate, wherein the accommodating recess comprises a wall exerting an elastic holding force on the connection tube.

The electrical link between the plate and the connection wire involves an intermediate part which is the connection tube. The connection tube is disposed in an accommodating recess of the plate. The wall of the accommodating recess and the connection tube are shaped such that the wall exerts an elastic force on the connection tube. A robust contact is thus ensured between the connection tube and the plate. Indeed, the elastic force involved notably makes it possible to overcome the creep effects of the various elements, such as the palette, that contribute to degrading the quality of the contact between the parts. The long-term reliability of the switching device is enhanced.

The features listed in the following paragraphs can be implemented independently of one another or according to all technically possible combinations:

According to one embodiment of the switching device, a portion of the connection wire is disposed inside the connection tube.

An electrical contact between the connection wire and the connection tube can be ensured in various ways, for example by crimping the connection tube on the connection wire.

The wall comprises an elastically deformed zone exerting an elastic holding force on the connection tube.

The connection tube is cylindrical. The connection tube is, for example, of circular section. The connection tube can be of square section.

The connection tube is made of copper, preferably annealed copper. The connection tube can also be made of aluminium.

These materials ensure a good electrical conductivity and good suitability for crimping.

The connection wire is a stranded wire.

The accommodating recess extends along a main axis.

The main axis of the accommodating recess is at right angles to the axis of rotation about which the switch can pivot.

The accommodating recess is cylindrical.

The accommodating recess comprises a substantially U-shaped section.

The plate is made of metal. The plate is formed from a metal leaf. The plate can be made of steel, for example of stainless steel.

The thickness of the plate is between 0.2 millimetre and 1 millimetre.

The accommodating recess has a nominal diameter of between 2 millimetres and 8 millimetres.

The connection tube is crimped onto the connection wire so as to ensure an electrical contact between the connection tube and the connection wire.

According to one aspect of the present disclosure, the connection tube comprises a first portion, called thin portion, of outer diameter less than a nominal diameter of the accommodating recess, and a second portion, called thick portion, of outer diameter greater than the nominal diameter of the accommodating recess, the nominal diameter of the accommodating recess being the diameter of the greatest circle inscribed in a cross-section of the accommodating recess, and measured before the insertion of the connection tube into the accommodating recess.

According to one embodiment, the connection tube is force-fitted into the accommodating recess such that the wall exerts an elastic holding force on the connection tube.

There is a radial play between the first portion of the connection tube and the wall of the accommodating recess, which allows easy insertion of the connection tube into the accommodating recess. The wall exerts an elastic holding force on the second portion of the connection tube.

According to one embodiment, the connection tube comprises a first axial end at which the connection wire leaves the connection tube and a second axial end opposite the first axial end, and the first portion, called thin portion, comprises the second axial end of the tube.

For example, the connection tube comprises a tapered end. The tapered end of the connection tube can be formed by a removable sleeve. The removable sleeve can be reusable.

According to an exemplary implementation of the switching device, the connection tube comprises a frustoconical portion comprising a large diameter and a small diameter, the small diameter being oriented towards the second axial end of the connection tube.

The large diameter of the frustoconical portion of the connection tube is oriented towards the first axial end of the connection tube.

The frustoconical portion comprises the second axial end of the connection tube.

The outer diameter of the first portion of the connection tube is less than the nominal diameter of the accommodating recess when the plate is in the free state. Thus, there is a radial play between the first portion of the connection tube and the accommodating recess, such that the introduction of the connection tube into the accommodating recess is easy. As the connection tube is introduced into the accommodating recess, the radial play decreases to become zero. In continuing with the insertion of the connection tube, the wall of the accommodating recess is pushed back by the tube, such that the wall of the recess exerts an elastic holding force on the connection tube. This elastic holding force guarantees a contact pressure between the plate and the connection tube which guarantees the quality of the electrical contact between these two parts. The elastic reserve guarantees a contact pressure that is substantially constant over time, which guarantees the long-term reliability.

According to one embodiment of the switching device, the connection tube comprises a first portion, called thin portion, and two second portions, called thick portions, the second portions being adjacent to the first portion and disposed axially on either side of the first portion, and the wall exerts an elastic holding force on the second portions.

The first portion, called thin portion, is formed by crushing the connection tube.

According to an exemplary implementation, the first portion, called thin portion, is formed by crushing the connection tube on the connection wire.

Thus, a single operation of crushing of the connection tube makes it possible to ensure the electrical link between the connection wire and the connection tube, and the electrical link between the connection tube and the plate. Furthermore, a mechanical hold of the wire in the tube is ensured.

The second portions, called thick portions, are formed jointly with the first portion, called thin portion, by crushing the connection tube on the connection wire.

One and the same connection tube crushing operation makes it possible to jointly form the first portion, called thin portion, and the second portions, called thick portions.

The connection tube comprises two first portions, called thin portions, offset along the axis of the connection tube, the two first portions being separated by a second portion, called thick portion.

The two first portions are separated by a distance of between 10 millimetres and 20 millimetres.

The first portion, called thin portion, extends axially over a distance of between 50% of the nominal diameter of the tube and 150% of the nominal diameter of the tube.

The wall of the accommodating recess comprises an aperture disposed facing the connection tube.

According to one embodiment of the switching device, the connection tube comprises a plastically deformed zone, the plastically deformed zone being in contact with the connection wire.

The electrical contact between the connection wire and the connection tube is ensured by crimping, which gives a reliable contact over time.

The plastically deformed zone in contact with the connection wire is offset axially with respect to the elastically deformed zone of the wall of the accommodating recess.

According to one embodiment, the wall of the accommodating recess comprises a plastically deformed zone, the plastically deformed zone being in contact with a plastically deformed zone of the connection tube.

The disclosure relates also to an electrical unit comprising:

- a main switch of a main circuit,
- a switching device as described previously, wherein the vacuum interrupter is disposed in parallel with the main switch.

The disclosure relates also to a method for manufacturing a switching device as described previously, comprising the steps of:

supplying a palette comprising an electrically conductive plate, the plate comprising an accommodating recess, the accommodating recess comprising an elastically deformable wall, supplying a connection wire, supplying a connection tube, placing the connection tube in the accommodating recess of the plate of the palette, placing the wire in the connection tube, locally deforming the connection tube so as to create a thin portion and at least one thick portion, such that the wall of the accommodating recess of the plate exerts an elastic holding force on the thick portion of the connection tube.

The disclosure relates also to a method for manufacturing a switching device as described previously, comprising the steps of:

supplying a palette comprising an electrically conductive plate, the plate comprising an accommodating recess, the accommodating recess comprising an elastically deformable wall, supplying a connection wire, supplying a connection tube, the connection tube comprising a first portion of outer diameter less than the nominal diameter of the accommodating recess of the plate previously supplied, and a second portion of outer diameter greater than the nominal diameter of the accommodating recess of the plate previously supplied, force-fitting the connection tube into the accommodating recess of the plate of the palette such that the wall of the accommodating recess of the plate exerts an elastic holding force on the second portion of the connection tube, placing the wire in the connection tube, locally deforming the connection tube so as to obtain a retention force retaining the connection wire in the connection tube.

Preferably, the step of local deformation of the connection tube jointly produces a local deformation of the wall of the accommodating recess of the plate so as to obtain a retention force retaining the connection tube in the accommodating recess.

BRIEF DESCRIPTION OF THE DRAWINGS

Other features, details and advantages will emerge on reading the following detailed description, and on analysing the attached drawings, in which.

DESCRIPTION OF THE EMBODIMENTS

In order to simplify the reading of the figures, the various elements are not necessarily represented to scale. In these figures, the elements that are identical bear the same references. Certain elements or parameters may be indexed, that is to say designated for example as first element or second element, or even first parameter and second parameter, etc. The purpose of this indexing is to differentiate elements or parameters that are similar, but not identical. This indexing does not imply any priority of one element, or parameter, over another, and the designations can be interchanged. When it is specified that a device comprises a given element, that does not preclude the presence of other elements in that device.

Figure 1:
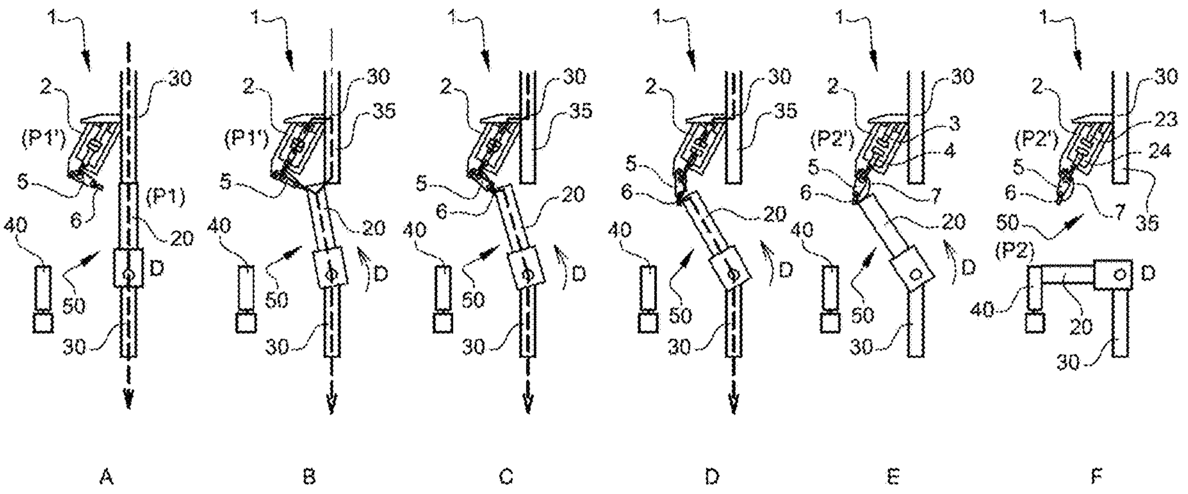
FIG. 1 is a schematic representation of an electrical unit comprising a switching device.

FIG. 1 shows an electrical unit 1 comprising:

a main switch 20 of a main circuit 30, a switching device 50, a vacuum interrupter 2 disposed in parallel with the main switch 20.

In other words, the vacuum interrupter 2 is shunt-mounted on the main circuit 30 of the electrical unit 1.

The vacuum interrupter 2 is provided for a medium-voltage, that is to say a voltage lying between 1 kV and 52 kV, electrical equipment item. The electrical unit 1 can for example be a circuit breaker, a disconnector or a switch. The vacuum interrupter 2 comprises a jacket forming a vacuum-tight enclosure. That is understood to mean that the pressure prevailing inside the enclosure is less than $10^{-4}$ millibar.

The fixed electrode 3 comprises a rod 23 and a contact body extending transversely to the rod. The mobile electrode 4 comprises a rod 24 and a contact body extending transversely to the rod. The fixed electrode 3 and the mobile electrode 4 are coaxial. The mobile electrode 4 is mobile in translation along the axis of the rod 24.

The main circuit 30 comprises a fixed contact 35. The switch 20 is rotationally mobile between a position P1 corresponding to a nominal position of circulation of the electric current in the main circuit 30, illustrated in A in FIG. 1, and a position P2 prohibiting the passage of electrical current in the main electrical circuit 30, illustrated in F. In the example represented, the switch 20 is then connected to an earthing contact 40. This earthing contact is optional.

FIG. 1 schematically describes the successively steps in an operation of an opening of the main circuit 30. The steps A to F are in chronological order. In B, the main switch 20 has initiated its rotation. An electrical contact between the switch 20 and the fixed contact 35 is still established. An electrical contact between the main switch 20 and the vacuum interrupter 2 is also made. An electrical current circulates simultaneously in the main circuit 30 and in the parallel branch including the vacuum interrupter 2. In C, the main switch 20 has continued its rotation and is no longer in contact with the fixed contact 35. All the current passes through the vacuum interrupter 2. The contact of the vacuum interrupter 2 is closed, that is to say that the fixed electrode 3 and the mobile electrode 4 are in contact, which corresponds to a position P1' of the mobile electrode 3. In D, the main switch 20 has triggered the opening of the contact, that is to say that the mobile electrode 4 has begun to move apart from the fixed electrode 3. The current passes in the vacuum interrupter 2 in the form of an electrical arc. In E, the separation between the mobile electrode 4 and the fixed electrode 3 is maximal, corresponding to a position P2' of the mobile electrode. Shortly after the phase current passes through zero, the current in the vacuum interrupter 2 is cut. The current in the main circuit 30 is thus cut. In F, the main switch 20 has completed its rotational movement and is in contact with the earthing contact 40.

The present disclosure relates to a switching device 50 of an electrical unit 1, comprising:

- a main switch 20 configured to be displaced between a closed position P1 allowing a passage of electrical current in a main electrical circuit 30 of the electrical unit 1 and an open position P2 prohibiting the passage of electrical current in the main electrical circuit 30,
- a vacuum interrupter 2 comprising:
  - a fixed electrode 3,
  - a mobile electrode 4, configured to be displaced between:
  - a first position P1', in which the fixed electrode 3 and the mobile electrode 4 are in contact, and
  - a second position P2', in which the fixed electrode 3 and the mobile electrode 4 are apart from one another,
- a palette 5 mechanically linked to the mobile electrode 4, configured to make the mobile electrode 4 switch over from the first position P1' to the second position P2', the palette 5 comprising an electrically conductive plate 6, the main switch 20 being configured to drive the palette 5 via the plate 6 in the switchover from the closed position P1 to the open position P2,

- a connection wire 7 electrically linking the plate 6 and the mobile electrode 4, the connection wire 7 being in electrical contact with a connection tube 8 disposed in an accommodating recess 9 of the plate 6, wherein the accommodating recess 9 comprises a wall 10 exerting an elastic holding force on the connection tube 8.

When the mobile electrode 4 is in the first position P1', the fixed electrode 3 and the mobile electrode 4 are in contact with one another so as to allow a passage of electrical current in the vacuum interrupter 2. The first position P1' of the mobile electrode 4 is called closed position of the vacuum interrupter 2. When the mobile electrode 4 is in the second position P2', the fixed electrode 3 and the mobile electrode 4 are apart from one another so as to prevent a passage of electrical current in the vacuum interrupter 2. The second position P2' of the mobile electrode 4 is called open position of the vacuum interrupter 2. The second position P2' corresponds to the maximum open position of the vacuum interrupter 2.

The palette 5 is driven by the switch 20 in the displacement travel opening the main circuit 30. The palette 5 is covered by an electrically conductive plate 6. The switch 20 enters into contact with the palette 5 via the plate 6. The switch 20 comprises two parallel rods 23, 24, the fixed contact 35 being inserted between these two rods. The two rods 23, 24 can be seen in FIG. 7. The symbols 25 and 25' denote the contact zones between the switch 20 and the plate 6. The kinematic link between the palette 5 and the mobile electrode 4 has not been detailed here. The plate 6 is electrically linked to the mobile electrode 4, in order for the electrical current to be able to pass through the vacuum interrupter 2 as illustrated by the steps B, C and D of FIG. 1. Thus, during these steps, there is an electrical continuity between the switch 20 and the mobile electrode 4.

According to one aspect of the present disclosure, the electrical link between the plate 6 and the connection wire 7 involves an intermediate part which is the connection tube 8. The plate 6 comprises an accommodating recess 9. The connection tube 8 is disposed in the accommodating recess 9 of the plate. The wall 10 of the accommodating recess 9 and the connection tube 8 are shaped such that the wall 10 exerts an elastic force on the connection tube 8. The wall 10 of the accommodating recess 9 is elastically deformable. Thus, a robust contact is ensured between the connection tube 8 and the plate 6. The long-term reliability of the switching device is enhanced.

In the example described here, a portion 11 of the connection wire 7 is disposed inside the connection tube 8.

An electrical contact between the connection wire 7 and the connection tube 8 can be ensured in various ways. In the example represented, the wire 7 is secured to the connection tube 8 by crimping.

The connection tube 8 is crimped onto the connection wire 7 so as to ensure an electrical contact between the connection tube 8 and the connection wire 7. The crimped portion of the connection wire 7 is stripped. Preferably, all of the portion 11 of the connection wire 7 contained inside the connection tube 8 is stripped. The connection wire 7 comprises a portion 12 disposed outside of the connection tube 8, and the portion 12 comprises an insulating sheath. The connection wire 7 is a stranded wire.

The wall 10 comprises an elastically deformed zone 13 exerting an elastic holding force on the connection tube.

The connection tube 8 is cylindrical. The connection tube 8 is, in the example represented, of circular section. According to an embodiment that is not represented, the connection tube 8 can be of square section. The connection tube 8 is, here, made of annealed copper. The tube can also be made of aluminium. These materials ensure a good electrical conductivity and a good suitability for crimping.

Figure 2:
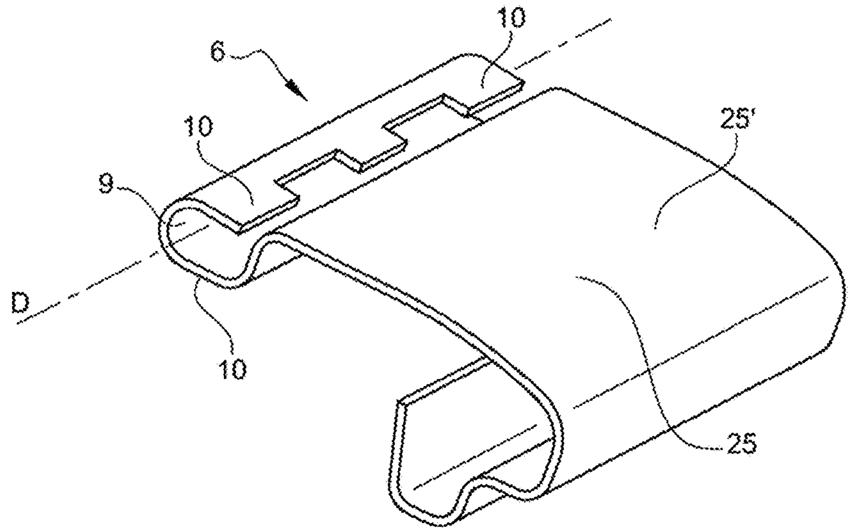
FIG. 2 is a perspective detailed view of a plate of the switching device.
Figure 3:
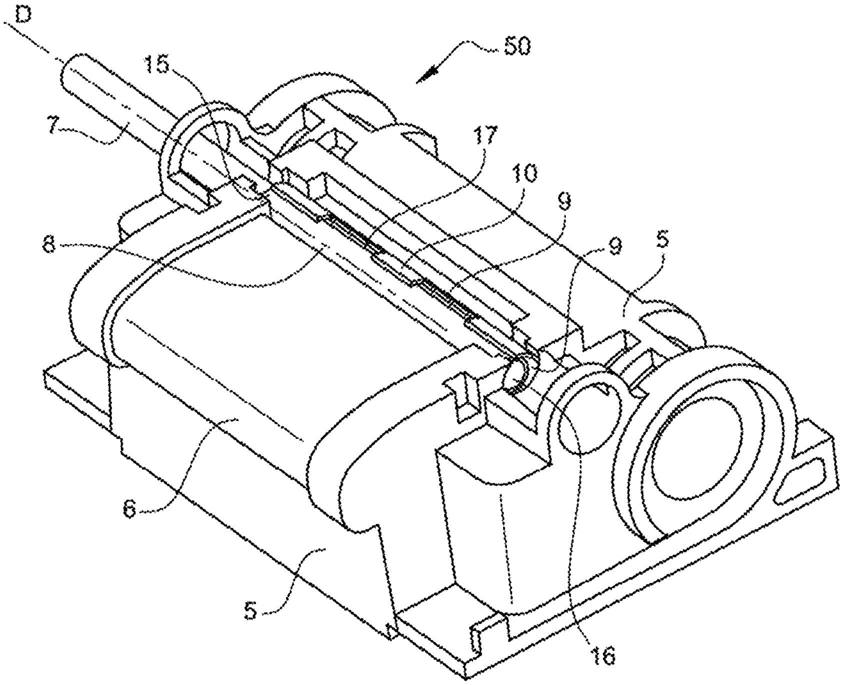
FIG. 3 is a perspective partial view of the switching device.

FIG. 2 details a plate 6 isolated from the palette 5.

The plate 6 is made of metal. The plate 6 is formed from a metal leaf. The plate 6 can be made of steel, for example stainless steel. The thickness of the plate 6 is between 0.2 and 1 millimetre. The nature of the material and the dimensions of the plate are chosen so as to exhibit a good resistance to the repetition of the impacts of the switch 20 against the plate 6 as the palette 5 is driven by the switch.

The accommodating recess 9 extends on a main axis D. The accommodating recess 9 is cylindrical. The main axis D of the accommodating recess 9 is at right angles to the movement of the switch 20. In particular, the main axis D of the accommodating recess 9 is at right angles to the axis of rotation about which the switch 20 can pivot.

Figure 8:
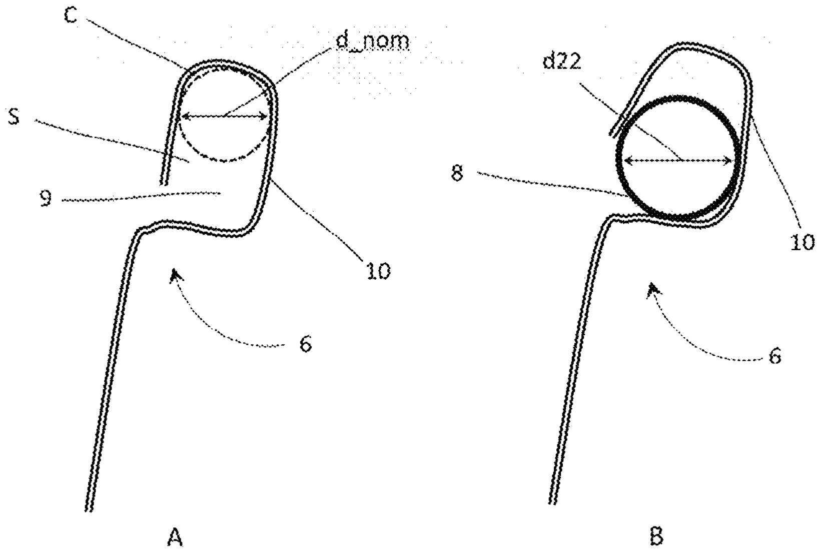
FIG. 8 is a partial side view detailing an aspect of the switching device.

FIG. 8 details the profile of the accommodating recess 9. The accommodating recess 9 comprises a substantially U-shaped section. The accommodating recess 9 has a nominal diameter d_nom of between 2 and 8 millimetres.

As detailed in part A of FIG. 8, the nominal diameter d_nom of the accommodating recess 9 is the diameter of the largest circle that can be inscribed in a cross-section S of the accommodating recess 9 when the plate 6 is in the free state, that is to say when the connection tube 8 is not present in the accommodating recess 9. In other words, the free state of the plate 6 corresponds to the geometry of the plate 6 before the connection tube 8 is inserted into the accommodating recess 9. In this configuration, the wall 10 of the accommodating recess 9 does not exert any force since there is no element constraining the wall 10 of the accommodating recess 9. The expression "inscribed circle" is understood to mean the largest virtual circle that can be represented in a cross-section S of the accommodating recess 9 without interfering with the walls delimiting the accommodating recess 9. The inscribed circle is schematically represented by the symbol C.

Figure 4:
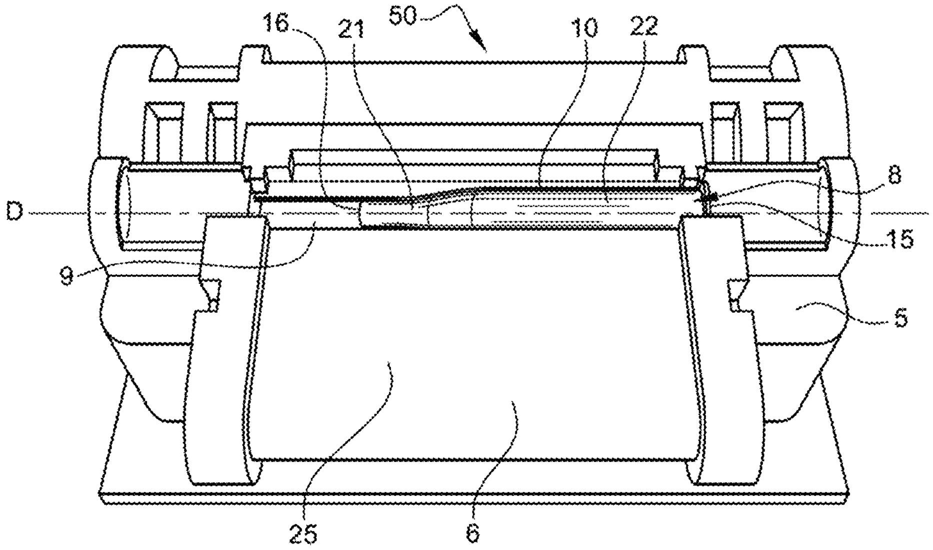
FIG. 4 is a partial top view of a first embodiment of the switching device.
Figure 5:
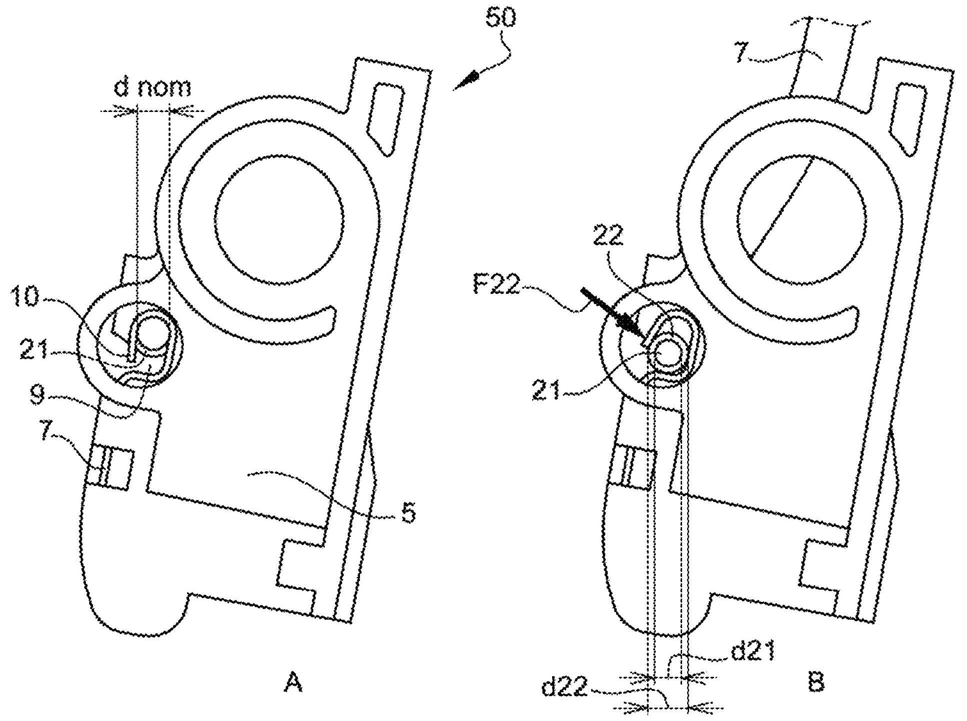
FIG. 5 is a partial side view of the switching device of FIG. 4.

As detailed in FIG. 4 and in FIG. 5, the connection tube 8 comprises a first portion 21, called thin portion, of outer diameter d21 less than a nominal diameter d_nom of the accommodating recess 9, and a second portion 22, called thick portion, of outer diameter d22 greater than the nominal diameter d_nom of the accommodating recess 9. As schematically represented in FIG. 8, the nominal diameter d_nom of the accommodating recess 9 is the diameter of the largest circle inscribed in a cross-section S of the accommodating recess 9, and measured before the insertion of the connection tube 8 into the accommodating recess 9.

According to a first embodiment, illustrated in FIG. 4 and in FIG. 5, the connection tube 8 is force-fitted into the accommodating recess 9 such that the wall 10 exerts an elastic holding force on the connection tube 8.

The outer diameter of the first portion 21 of the connection tube 8 is less than the nominal diameter d_nom of the accommodating recess 9 when the plate 6 is in the free state. Thus, there is a radial play between the first portion 21 of the connection tube 8 and the accommodating recess 9, such that the insertion of the connection tube 8 into the accommodating recess 9 is easy. The insertion of the connection tube 8 into the accommodating recess 9 is performed by translating the tube 8 in the direction of its main axis, which is also the direction of the main axis of the recess. As the connection tube 8 is introduced into the accommodating recess 9, the radial play decreases to become zero. Once the contact is established between the tube 8 and the wall 10, by continuing with the insertion of the connection tube 8, the wall 10 of the accommodating recess 9 is pushed back by the tube 8. Thus, once the tube is disposed in the accommodating recess 9, the wall 10 of the recess 9 exerts an elastic holding force on the connection tube 8. This elastic holding force guarantees a contact pressure between the plate 6 and the connection tube 8 which guarantees the quality of the electrical contact between these two parts. The elastic reserve guarantees a contact pressure that is substantially constant in time, which guarantees the long-term reliability. The elastic holding force is schematically represented by the symbol F22 in FIG. 5.

The nominal diameter d_nom of the accommodating recess 9 is the diameter of the section corresponding to a determined position along the axis of the recess 9. In other words, the nominal diameter d_nom can change along the axis of the accommodating recess 9. In the case where the accommodating recess 9 is of cylindrical form, the nominal diameter d_nom is constant along the main axis D of the accommodating recess 9.

The connection tube 8 comprises a first axial end 15 at which the connection wire 7 leads the connection tube 8, and a second axial end 16 opposite the first axial end 15, and the first portion 21, called thin portion, comprises the second axial end 16 of the tube. This embodiment is detailed in FIG. 4 and in FIG. 10.

The first axial end 15 of the tube 8 corresponds to the end at which the wire 7 leaves the connection tube 8 in order to join the mobile electrode 4. According to the embodiments illustrated, one end of the connection wire 7 is axially contained between the first axial end 15 of the connection tube 8 and the second axial end 16 of the connection tube 8. In other words, one end of the connection wire 7 is contained inside the connection tube 8. In variants that are not illustrated, the connection wire 7 can run through the connection tube 8 from one axial end 15 to the other axial end 16.

According to the first embodiment, illustrated in FIG. 4, the connection tube 8 comprises a tapered end.

Figure 10:
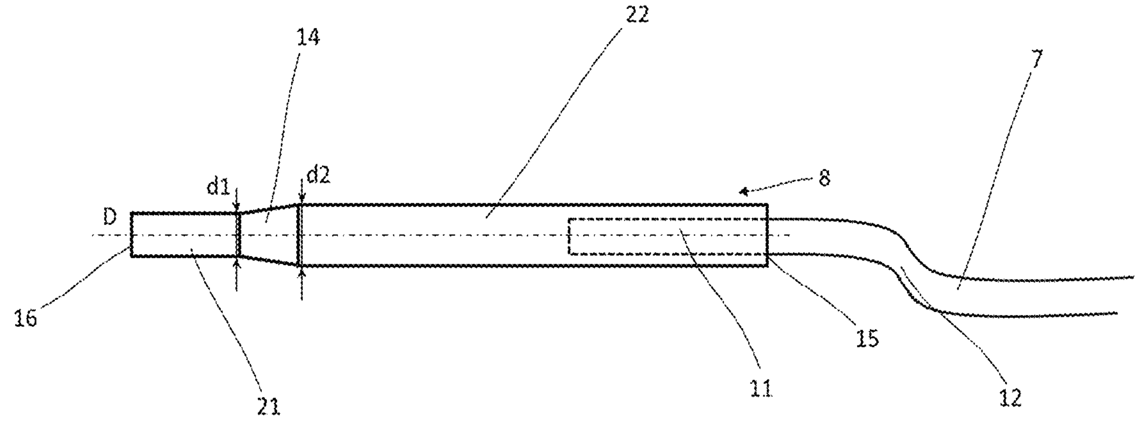
FIG. 10 is a schematic partial side view of another variant of the first embodiment of the switching device.

According to a variant embodiment of the switching device, illustrated in FIG. 10, the connection tube 8 comprises a frustoconical portion 14 comprising a large diameter d2 and a small diameter d1, the small diameter d1 being oriented towards the second axial end 16 of the connection tube 8. In other words, the small diameter d1 is closer to the second axial end 16 of the tube 8 than the first axial end 15. The large diameter d2 of the frustoconical portion 14 of the connection tube 8 is oriented towards the first axial end 15 of the connection tube 8. In other words, the large diameter d2 is closer to the first axial end 15 of the tube 8 than the second axial end 16. According to a variant that is not represented, the frustoconical portion 14 can comprise the second axial end 16 of the connection tube 8. In this case, the connection tube 8 is terminated by the narrowest end of the truncated cone. The tube 8 thus has an end of nosecone form. According to a particular exemplary implementation, the tapered end of the connection tube 8 is formed by a removable sleeve. In other words, the tube 8, for the mounting thereof, receives a sleeve which forms a thinner portion at the tapered end. The thinner portion is inserted into the tube 8, more specifically into the second axial end of the tube. This added thinner portion makes it possible to easily perform the insertion of the tube 8 into the accommodating recess 9. When the tube is fully inserted into the recess 9, the added thinner portion emerges axially from the recess, and the removable sleeve can be removed from the tube 8. For that, the outer diameter of the removable sleeve is chosen so as to allow a grip in the tube that is sufficient to ensure that the sleeve is held in position while the tube is being mounted in the recess, and that is weak enough to allow the removable sleeve to be extracted at the end of mounting. The removable sleeve can be reused after removal. The added thinner portion allows a cylindrical tube, which is the form that is simplest to manufacture, to be easily inserted into the accommodating recess 9.

Figure 6:
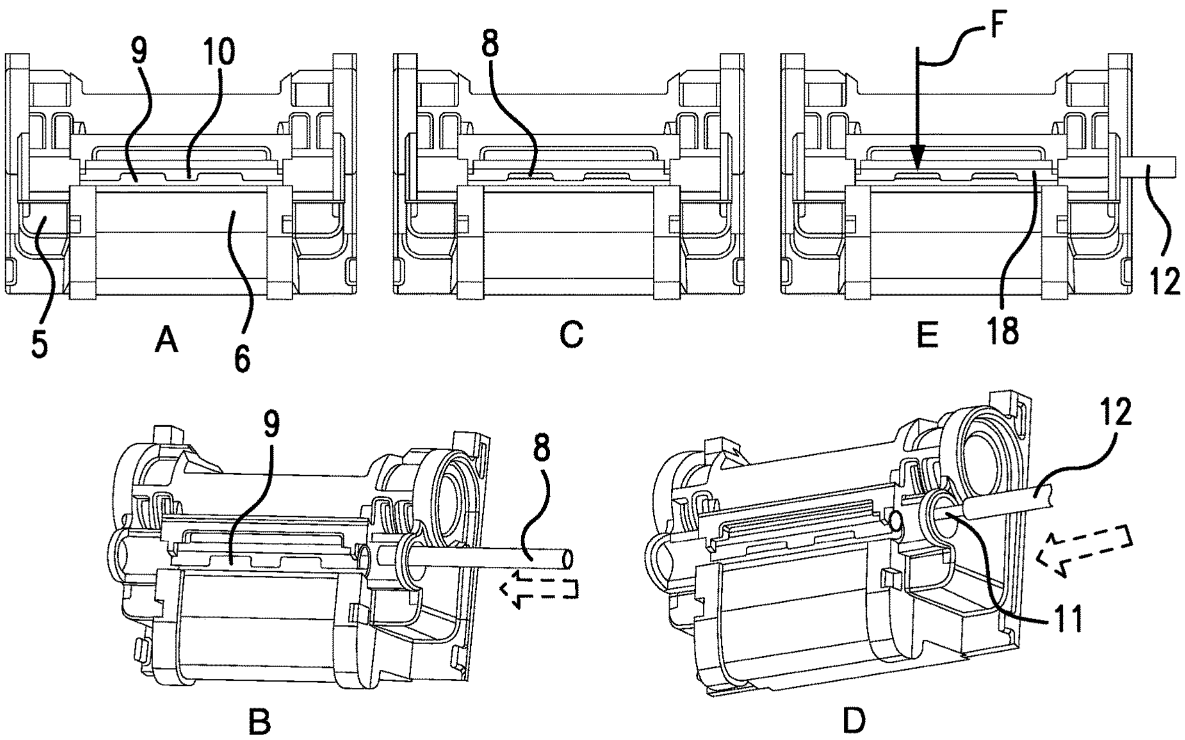
FIG. 6 is a schematic representation of steps in manufacturing a switching device according to a second embodiment.
Figure 7:
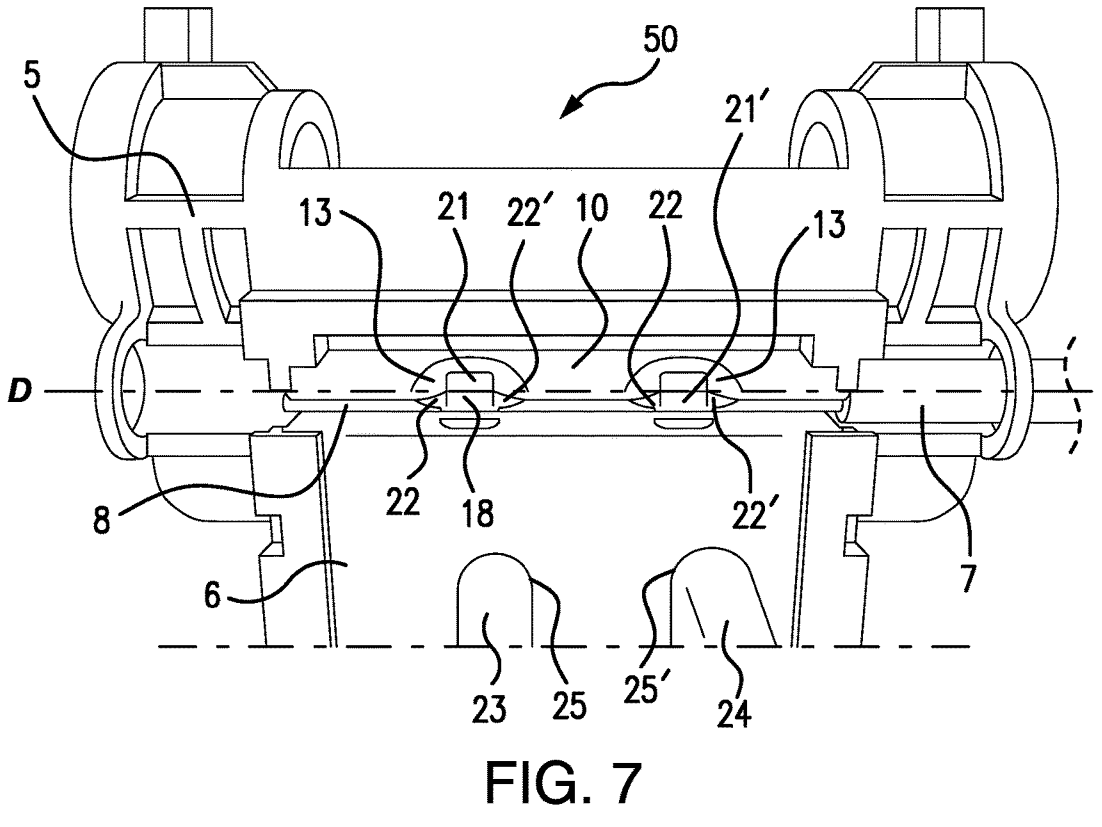
FIG. 7 is a partial top view of a switching device according to the second embodiment.

FIG. 6 and FIG. 7 illustrate a second embodiment of the switching device 50. As can be seen in FIG. 7, the connection tube 8 comprises a first portion 21, called thin portion, and two second portions 22, 22', called thick portions, the second portions 22, 22' being adjacent to the first portion 21 and disposed axially on either side of the first portion 21, and the wall 10 exerts an elastic holding force on the second portions 22, 22'.

Figure 11:
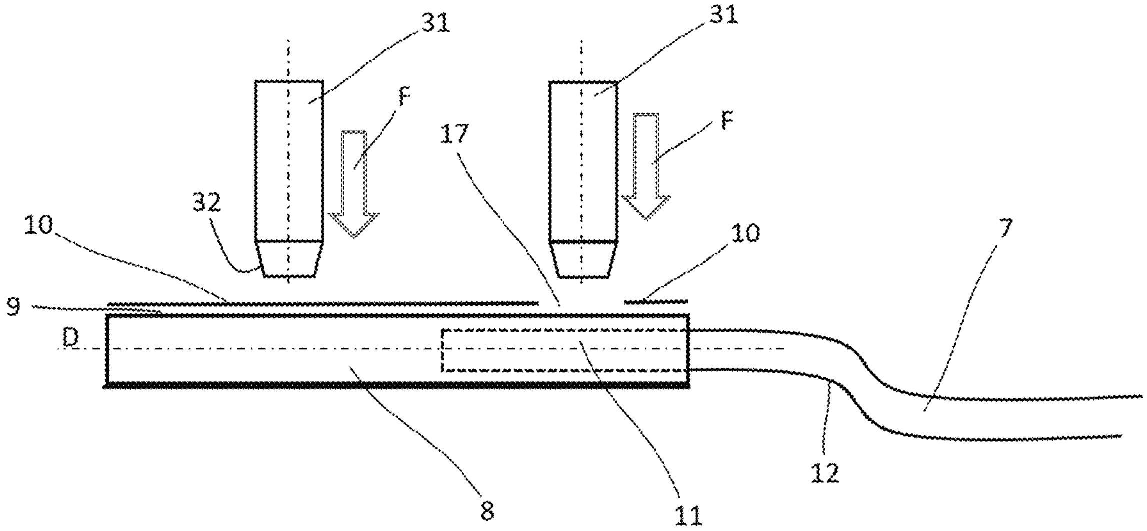
FIG. 11 is a schematic partial side view illustrating a switching device according to the second embodiment.

In this embodiment, the first portion 21, called thin portion, is formed by crushing of the connection tube 8. More specifically, the first portion 21, called thin portion, is formed by crushing of the connection tube 8 on the connection wire 7. In other words, the first portion 21 is formed by a crushed portion of the connection tube 8. For that, and as schematically represented in FIG. 11 and in FIG. 12, a tool 31, of punch type, bears on the wall of the tube 8 in applying a radial force, that is to say a force at right angles to the axis D of the tube 8.

Thus, a single operation of crushing of the connection tube 8 makes it possible to ensure the electrical link between the connection wire 7 and the connection tube 8, as well as the electrical link between the connection tube 8 and the plate 6. Furthermore, a mechanical holding of the wire 7 in the tube 8 is ensured.

Figure 12:
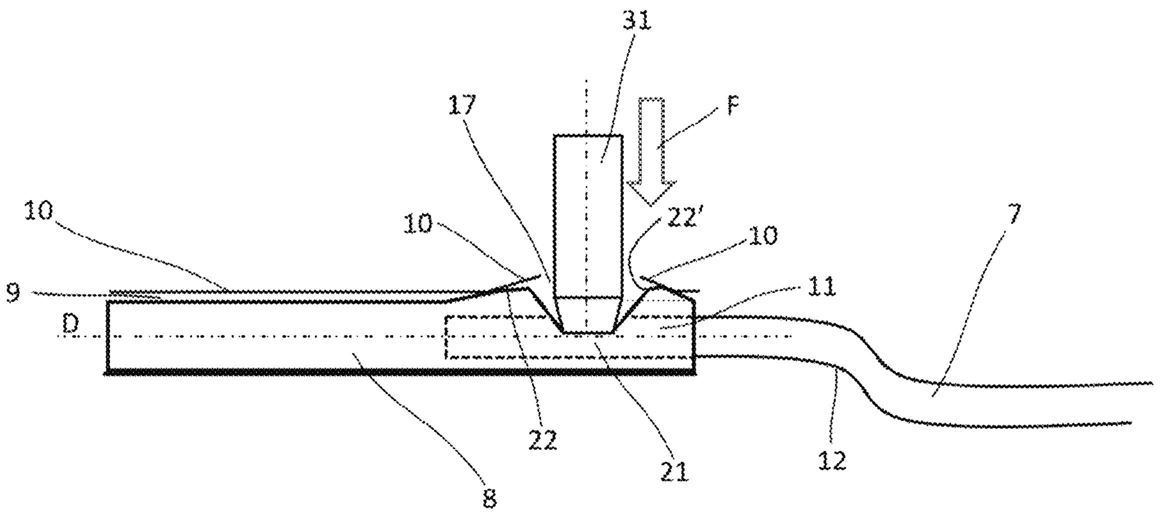
FIG. 12 is another schematic partial side view illustrating the switching device of FIG. 11.

The second portions 22, 22', called thick portions, are formed jointly with the first portion 21, called thin portion, by crushing of the connection tube 8 on the connection wire 7. FIG. 12 schematically illustrates the result obtained after the operation of crushing of the connection tube 8. One and the same operation of crushing of the connection tube 8 makes it possible to jointly form the first portion 21, called thin portion, and the second portions 22, 22', called thick portions.

In fact, the deformation of the wall of the tube 8 in a radial direction is accompanied by a pushing back of material in an axial direction. The material pushed back during the operation of crushing of the tube 8 locally increases the diameter of the connection tube 8 in the zones adjacent to the thin portion 21. The material is pushed back on each side of the thin zone, in two opposite directions. Two thick portions are therefore obtained. The thin portion 21 and the thick portions 22, 22' are obtained in a single operation of crushing of the connection tube 8. The punching tool 31 has flanks 32 that are inclined so as to facilitate the pushing back of the material for creating the thick portions 22, 22' of the tube 8. The end of the tool is, for example, of trapezoidal form, as illustrated in FIG. 11. The crushing of the connection tube 8 corresponds to a stamping of the connection tube 8.

The diameter of the connection tube 8, before deformation, is greater than the diameter of the connection wire 7 so as to allow an easy introduction of the connection wire 7 into the connection tube 8. The deformation of the wall of the connection tube 8 makes it possible to progressively cancel the play between the wall of the tube 8 and the wire 7. By continuing the deformation until the tube is crushed, a compression of the wire 7 inside the deformed wall of the tube 10 is obtained. An elastic link between the wire 7 and the tube 8 is thus obtained, as is a mechanical holding of the connection wire 7.

The second portions 22, 22', called thick portions, have an outer diameter greater than the nominal diameter d_nom of the accommodating recess 9 when the plate 6 is in the free state. Since the thick portions 22, 22' have a diameter greater than the nominal diameter d_nom of the accommodating recess 9, an elastic holding force is created by the wall 10 of the accommodating recess 9. In other words, the second portions 22, 22', called thick portions, of the connection tube 8 tend to deform the wall 10 of the accommodating recess 9.

According to the embodiment of FIG. 7, the connection tube 8 comprises two first portions 21, 21', called thin portions, that are offset along the axis of the connection tube, the two first portions 21, 21' being separated by a second portion 22, called thick portion. The two first portions 21, 21' are separated by a distance of between 10 millimetres and 20 millimetres. This distance is measured along the axis D. The first portion 21, called thin portion, extends axially over a distance of between 50% of the nominal diameter d_nom of the tube and 150% of the nominal diameter d_nom of the tube.

The wall 10 of the accommodating recess 9 comprises an aperture 17 disposed opposite the connection tube 8. The aperture 17 is opposite the first portion 21, called thin portion, of the connection tube 8.

The aperture 17 allows the passage of the tool 31 used to locally deform the connection tube 8. In other words, the aperture 17 makes it possible to deform the connection tube 8 without deforming the wall 10 of the accommodating recess 9. The force applied by the tool 31 is thus fully transmitted to the tube 8, which limits the total force to be applied to the tool 31.

Figure 9:
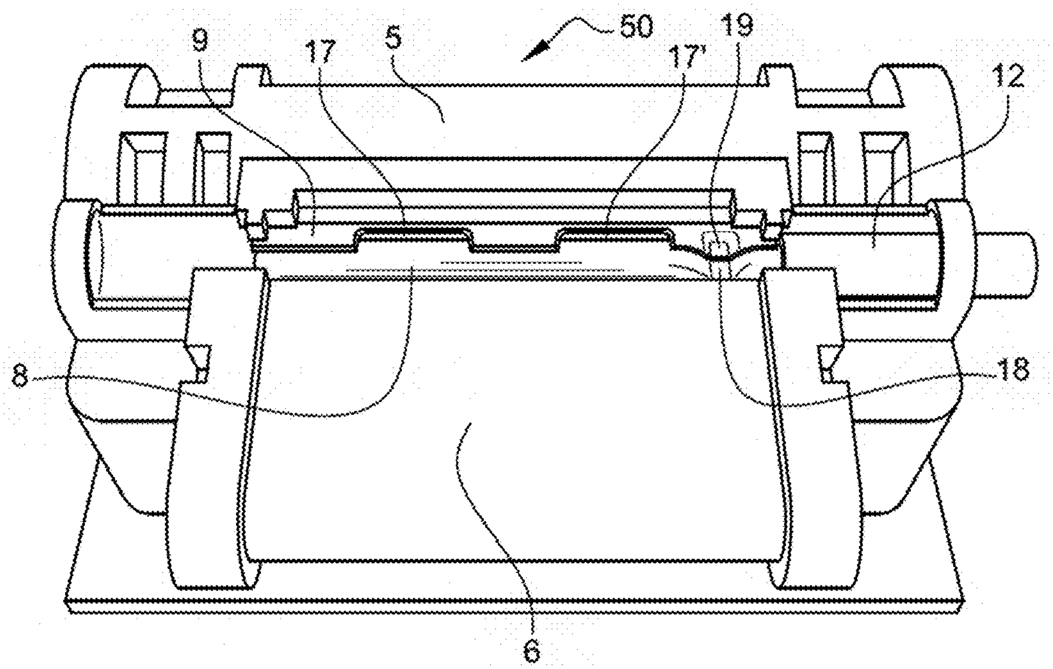
FIG. 9 is a partial perspective view of a variant of the first embodiment of the switching device.

As illustrated in FIG. 9, the connection tube 8 comprises a plastically deformed zone 18, the plastically deformed zone 18 being in contact with the connection wire 7. This feature is common to all the embodiments.

In other words, the electrical contact between the connection wire 7 and the connection tube 8 is ensured by crimping, which gives a contact that is reliable over time. The plastically deformed zone 18 of the connection tube 8 is in contact with an electrically conductive portion of the wire 7. In other words, a stripped portion of the wire 7 is introduced into the connection tube 8 and the connection tube 8 is deformed so as to secure the wire 7 and the tube 8 by crimping.

The plastically deformed zone 18 in contact with the connection wire 7 is offset axially with respect to the elastically deformed zone 13 of the wall 10. In other words, the plastically deformed zone 18 of the connection tube is offset along the axis of the tube with respect to the elastically deformed zone 13 of the wall 10 of the accommodating recess 9.

In the example of FIG. 9, the wall 10 of the accommodating recess 9 comprises a plastically deformed zone 19, the plastically deformed zone 19 being in contact with a plastically deformed zone 18 of the connection tube 8. In other words, in this example, the wall 10 of the recess 9 and the connection tube 8 are simultaneously deformed. The deformation of the wall 10 of the recess 9 against the tube 8 makes it possible to ensure that the tube 8 is mechanically held.

FIG. 6 schematically represents the main steps of a method of manufacturing a switching device 50 according to the second embodiment. The method comprises the steps of:

(a1) supplying a palette 5 comprising an electrically conductive plate 6, the plate 6 comprising an accommodating recess 9, the accommodating recess 9 comprising an elastically deformable wall 10, (b1) supplying a connection wire 7, (c1) supplying a connection tube 8, (d1) placing the connection tube 8 in the accommodating recess 9 of the plate 6 of the pallet palette 5, (e1) placing the wire 7 in the connection tube 8, (f1) locally deforming the connection tube 8 so as to create a thin portion 21 and at least one thick portion 22, such that the wall 10 of the accommodating recess of the plate exerts an elastic holding force on the thick portion of the connection tube.

In FIG. 6, the step a1 is schematically represented by the part A, the steps c1 and d1 are schematically represented by the parts B and C, the steps b1 and e1 are schematically represented by the part D, and the step f1 is schematically represented by the part E. In the part E of the figure, the thick arrow F schematically represents the application of the local deformation force on the connection tube 8. In this embodiment, the tube 8 is introduced with a radial play into the accommodating recess 9, and the crushing of the tube 8 creates the thin portion 21 and the adjacent thick portions 22. After deformation of the tube, the wall 10 exerts an elastic holding force on the tube 8.

The disclosure relates also to a method for manufacturing a switching device 50 according to the first embodiment. The method comprises the steps of:

(a2) supplying a palette 5 comprising an electrically conductive plate 6, the plate 6 comprising an accommodating recess 9, the accommodating recess 9 comprising an elastically deformable wall 10, (b2) supplying a connection wire 7, (c2) supplying a connection tube 8, the connection tube 8 comprising a first portion 21 of outer diameter less than the nominal diameter d_nom of the accommodating recess 9 of the plate 6 previously supplied, and a second portion 22 of outer diameter greater than the nominal diameter d_nom of the accommodating recess 9 of the plate 6 previously supplied, (d2) force-fitting the connection tube 8 into the accommodating recess 9 of the plate 6 of the palette 5 such that the wall 10 of the accommodating recess 9 of the plate 6 exerts an elastic holding force on the second portion 22 of the connection tube 8, (e2) placing the wire 7 in the connection tube 8, (f2) locally deforming the connection tube 8 so as to obtain a retention force retaining the connection wire 7 in the connection tube 8.

Preferably, the step f2 of local deformation of the connection tube 8 jointly produces a local deformation of the wall 10 of the accommodating recess 9 of the plate 6 so as to obtain a retention force retaining the connection tube 8 in the accommodating recess 9.

The substep d2 of force-fitting of the connection tube in the accommodating recess 9 can also be performed after the substep f2 of deformation of the connection tube. In this case, the step e2 of placing of the wire 7 in the tube 8 is performed directly after the substep c2 of supplying of the connection wire 8.

The invention claimed is:

1. A switching device of an electrical unit, comprising:

a main switch configured to be displaced between a closed position allowing a passage of electrical current in a main electrical circuit of the electrical unit and an open position prohibiting the passage of electrical current in the main electrical circuit, a vacuum interrupter comprising:

a fixed electrode, a mobile electrode, configured to be displaced between:

a first position, in which the fixed electrode and the mobile electrode are in contact, and a second position, in which the fixed electrode and the mobile electrode are apart from one another, a palette mechanically linked to the mobile electrode, configured to make the mobile electrode switch over from the first position to the second position, the palette comprising an electrical conductive plate, the main switch being configured to drive the palette via the plate in the switchover from the closed position to the open position, a connection wire electrically linking the plate and the mobile electrode, the connection wire being in electrical contact with a connection tube disposed in an accommodating recess of the plate, wherein the accommodating recess comprises a wall exerting an elastic holding force on the connection tube.

2. The switching device according to claim 1, wherein a portion of the connection wire is disposed inside the connection tube.

3. The switching device according to claim 1, wherein the connection tube comprises a first portion of outer diameter less than a nominal diameter of the accommodating recess, and a second portion of outer diameter greater than the nominal diameter of the accommodating recess, the nominal diameter of the accommodating recess being a diameter of a greatest circle inscribed in a cross-section of the accommodating recess, and measured before insertion of the connection tube into the accommodating recess.

4. The switching device according to claim 3, wherein the connection tube comprises a first axial end at which the connection wire leaves the connection tube and a second axial end opposite the first axial end, and wherein the first portion comprises the second axial end of the tube.

5. The switching device according to claim 3, wherein the connection tube comprises the first portion and two of the second portions the two second portions being adjacent to the first portion and disposed axially on either side of the first portion, and wherein the wall exerts an elastic holding force on the two second portions.

6. The switching device according to claim 5, wherein the first portion is formed by crushing the connection tube.

7. The switching device according to claim 5, wherein the first portion is formed by crushing the connection tube on the connection wire.

8. The switching device according to claim 5, wherein the two second portions are formed jointly with the first portion by crushing the connection tube on the connection wire.

9. A method for manufacturing the switching device according to claim 5, comprising:

supplying the palette comprising the electrically conductive plate, the plate comprising the accommodating recess, the accommodating recess comprising the elastically deformable wall, supplying the connection wire, supplying the connection tube, placing the connection tube in the accommodating recess of the plate of the palette, placing the wire in the connection tube, locally deforming the connection tube so as to create the first portion and at least one of the two second portions, such that the wall of the accommodating recess of the plate exerts the elastic holding force on the at least one of the two second portions of the connection tube.

10. The switching device according to claim 1, wherein the connection tube comprises a plastically deformed zone, the plastically deformed zone being in contact with the connection wire.

11. The switching device according to claim 1, wherein the wall of the accommodating recess comprises a plastically deformed zone, the plastically deformed zone being in contact with a plastically deformed zone of the connection tube.

12. An electrical unit comprising:

the switching device according to claim 1, and the main switch of the main circuit, wherein the vacuum interrupter is disposed in parallel with the main switch.

13. A method for manufacturing the switching device according to claim 1, comprising:

supplying the palette comprising the electrically conductive plate, the plate comprising the accommodating recess, the accommodating recess comprising the elastically deformable wall, supplying the connection wire, supplying the connection tube, the connection tube comprising a first portion of outer diameter less than a nominal diameter of the accommodating recess of the plate previously supplied, and a second portion of outer diameter greater than the nominal diameter of the accommodating recess of the plate previously supplied, force-fitting the connection tube in the accommodating recess of the plate of the palette such that the wall of the accommodating recess of the plate exerts the elastic holding force on the second portion of the connection tube, placing the wire in the connection tube, locally deforming the connection tube so as to obtain a retaining force retaining the connection wire in the connection tube.

14. The manufacturing method according to claim 13, wherein locally deforming the connection tube jointly produces a local deformation of the wall of the accommodating recess of the plate so as to obtain a retaining force retaining the connection tube in the accommodating recess.

* * * * *